(12) United States Patent
Artino et al.

(10) Patent No.: US 8,378,988 B1
(45) Date of Patent: Feb. 19, 2013

(54) SYSTEM CONTROLLED BY DATA BEARING RECORDS FOR PERMITTING ACCESS

(75) Inventors: Robert V. Artino, North Canton, OH (US); Roy Hathaway, Clinton, OH (US); Edward J. Ujhazy, Jr., Uniontown, OH (US); Dustin Cairns, Deerfield, OH (US)

(73) Assignee: Diebold, Incorporated, North Canton, OH (US)

( * ) Notice: Subject to any disclaimer, the term of this patent is extended or adjusted under 35 U.S.C. 154(b) by 174 days.

(21) Appl. No.: 12/930,830

(22) Filed: Jan. 18, 2011

Related U.S. Application Data

(60) Provisional application No. 61/336,207, filed on Jan. 19, 2010.

(51) Int. Cl.
*G06F 3/041* (2006.01)
(52) U.S. Cl. .......... 345/173; 345/175; 235/382; 340/5.2
(58) Field of Classification Search .......... 345/173–179; 235/375, 379, 382, 451; 340/5.2, 5.7
See application file for complete search history.

(56) References Cited

U.S. PATENT DOCUMENTS

| | | | |
|---|---|---|---|
| 2005/0083171 A1* | 4/2005 | Hamilton | 340/5.7 |
| 2005/0284931 A1* | 12/2005 | Adams et al. | 235/382 |
| 2006/0181402 A1* | 8/2006 | Martin et al. | 340/506 |
| 2009/0289105 A1* | 11/2009 | Block et al. | 235/379 |
| 2010/0012719 A1* | 1/2010 | Meek et al. | 235/379 |
| 2010/0102118 A1* | 4/2010 | Ramachandran et al. | 235/379 |
| 2010/0252625 A1* | 10/2010 | Register et al. | 235/382.5 |
| 2011/0062232 A1* | 3/2011 | Smith et al. | 235/379 |
| 2011/0132981 A1* | 6/2011 | Smith et al. | 235/379 |
| 2011/0266340 A9* | 11/2011 | Block et al. | 235/379 |
| 2011/0272460 A9* | 11/2011 | Drummond et al. | 235/379 |

* cited by examiner

*Primary Examiner* — Kimnhung Nguyen
(74) *Attorney, Agent, or Firm* — Ralph E. Jocke; Daniel D. Wasil; Walker & Jocke

(57) ABSTRACT

An apparatus allows entry of an individual into an area responsive to data read from data bearing records. Data read from data bearing records such as user cards is evaluated for correspondence with stored data by at least one processor. The condition of at least one lock (26, 30, 48, 52) associated with an access structure (14) is changed responsive to correspondence of the record data and stored data. The structure (14) controls access to and exit from a facility. An operator terminal (12) provides visible outputs through a display (72) and is usable to control functional aspects of the structure as well as to enable the operator to receive indications of conditions associated with components that control access to and exit from the structure.

20 Claims, 11 Drawing Sheets

SYSTEM CONTROLLED BY DATA BEARING RECORDS FOR PERMITTING ACCESS

CROSS REFERENCE TO RELATED APPLICATIONS

This application claims benefit pursuant to 35 U.S.C. §119(e) of Provisional Application No. 61/336,207 filed Jan. 19, 2010, the disclosure of which is incorporated herein by reference in its entirety.

TECHNICAL FIELD

This invention relates to systems that operate responsive to data bearing records, and specifically to systems for allowing entry of an individual into an area, which may be classified in U.S. Class 235, Subclass 382.

BACKGROUND

Systems may control access for entry to a facility or area based on data bearing records. Such systems may include the reading of data from data bearing records such as user cards or other articles or devices. Such data bearing records may be read through operation of a reader device, and the data read therefrom compared to stored data for purposes of determining if a bearer of the record is an individual that is authorized to access the facility or area. Such data bearing records may take different forms such as cards, tokens or other items from which data may be read. Such items may include magnetic stripe cards, radio frequency identification (RFID) cards, optically encoded cards, smart cards or other items from which data may be read. In some embodiments additional data may be also read so as to identify a particular individual as authorized to access an area or facility. Such read data may be compared with stored data or correlated with other perceivable data to identify the individual as the appropriate authorized individual to be the possessor of the data bearing record with rights to access the facility. Such additional data may include the input of secret codes or personal identification numbers. Alternatively such data may include the sensing of biometric data, the receipt of voice data or other data that can be compared for purposes of identifying an authorized individual.

Systems for controlling access may be used in connection with facilities where individuals who do not possess data bearing records such as a member of the public such as customers, visitors or the like, must also access the facility. Such individuals may also need to be provided access to or egress from the facility and the activities of such individuals controlled as may be appropriate.

Such systems may benefit from improvements.

OBJECTS OF EXEMPLARY EMBODIMENTS

It is an object of an exemplary embodiment to provide an apparatus for controlling access to a facility or area.

It is an object of an exemplary embodiment to provide an apparatus for providing access to a facility or area based on data read from data bearing records.

It is a further object of an exemplary embodiment to provide an apparatus and controlling at least one operation of at least one component of a structure that controls access to a facility such as a building or an area thereof.

It is a further object of an exemplary embodiment to provide an apparatus and controlling access to a structure that controls the exit of personnel from a facility such as a building.

It is a further object of an exemplary embodiment to provide an apparatus that controls access by controlling the status of locks which control the condition of doors that provide for entry and/or exit from a facility.

It is a further object of an exemplary embodiment to provide an apparatus that controls access to or exit from a facility and which has components that can be controlled responsive to operator input.

It is a further object of exemplary embodiments to provide methods of operation of an apparatus which controls access and at least one function associated with a structure for controlling access.

Further objects of exemplary embodiments will be made apparent in the following Detailed Description of Exemplary Embodiments and the appended claims.

The foregoing objects are accomplished in an exemplary embodiment by an apparatus for controlling entry to a facility. The exemplary apparatus includes an operator terminal. The operator terminal is operative to provide indicating outputs that are perceivable both visually and audibly by at least one operator within a facility. In some exemplary embodiments the facility may include the interior of a bank or other facility to which access is to be controlled. For purposes of this disclosure a facility shall be deemed to refer to a building or structure or a combination thereof, as well as an area or region within a building or structure.

In an exemplary embodiment the operator terminal is associated with a structure which is configured to control access to the interior area of the building as well as exit from the building. The structure may include one or more data bearing record reading devices therein or adjacent thereto. The data bearing record reading device may include one or more devices for reading data from a record such as a bearer card or article. The data read from the card or article may be associated with particular users or one or more categories of individuals who are authorized to access the area or facilities.

The reader may be operatively connected to one or more processors which have associated data stores including data that has a predetermined relationship to that which is read from data bearing records. Such processors may be programmed to operate so as to identify data associated with individuals authorized to access the area or facility. Further, in some embodiments additional input devices operative to receive other identifying data from a user may also be included. These input devices may include key pads, biometric reading devices, cameras, voice sensing devices or other devices that may receive inputs corresponding to the user. Such inputs may also be received and compared through operation of at least one processor with stored data and/or data corresponding to that read from the data bearing records, so as to identify the user as a person who is authorized to access the area or facility.

The exemplary structure used for controlling access and egress includes an outer entry door which is associated with an outer entry door lock. The outer entry door lock is a component of the structure and is electrically changeable between locked and unlocked conditions. The structure further includes an inner entry door and an inner entry door lock which are likewise operative to be electrically changeable between locked and unlocked conditions. The outer entry door can be accessed and opened by persons externally of the facility to access the interior of the structure, and the inner entry door when opened enables a person to pass from the structure and access an interior area of a facility.

A walled generally continuous passage extends between the outer entry door and the inner entry door. In the exemplary embodiment the entry passage includes one or more detectors. The detectors are operative to sense conditions associated with individuals that suggest that the individual may be carrying a weapon. Such a detector may include a metal detector, electronic aroma sensor, x-ray sensor, image scanning sensor, or a combination of sensors that is operative to detect the condition associated with an individual that suggests a person may be carrying a weapon or other dangerous material.

In the exemplary embodiment the structure further includes a generally continuous walled exit passage separate from but adjacent to the entry passage. The walled exit passage includes an inner exit door which can be opened and through which a person in the interior area of the facility can enter the exit passage of the structure. The exit passage further includes an outer exit door. The outer exit door enables an individual to exit from the walled exit passage to the exterior of the facility. Each of the inner exit door and outer exit door are controlled by a door lock that is a component of the structure and is electrically changeable between locked and unlocked conditions.

In the exemplary embodiment each of the entry passage and exit passage have components including sensors associated therewith. The sensors operate to detect persons in each of a plurality of disposed locations within the respective passage. Further in the exemplary embodiment a plurality of cameras is positioned to provide visual images of the passages. In the exemplary arrangement at least one camera has a field of view that includes at least a portion of a respective entry door or exit door. Thus each camera can capture in its field of view images of persons entering and exiting each of the doors.

The exemplary operator terminal includes a visual display and manual input devices. In some examples such devices may be a touchscreen display. The exemplary operator terminal operates to control, or work in conjunction with a control unit to control components of the structure so that only one person at a time is enabled to pass through the entry passage. For example if multiple people enter the entry passage, the operator terminal or an associated control unit is programmed so it will not unlock the inner entry door. The exemplary operator terminal provides at least one visual and/or audible indication of this condition. The terminal operator in response to the condition, may provide a manual input to the operator terminal so as to be in audible communication with the interior of the entry passage so that the terminal operator may instruct the persons to exit the passage and then pass through one at a time.

In further exemplary embodiments the detector may operate to sense conditions corresponding to the presence of a probable weapon. For purposes of this disclosure a weapon shall be deemed to include devices that can harm persons or property such as firearms, bombs, explosives, knives, stun guns, incendiary devices, poison containers and the like. In such circumstances the operator terminal or other connected control unit will detect an abnormal condition and the operator terminal will provide visible and/or audio indications of this condition. In such circumstances the inner entry door will remain locked so as to prevent the person with the item that is a probable weapon from entering the interior area of the facility. In such circumstances the operator may communicate by providing an input to the terminal so as to be in audible communication to the person in the passage. The operator may instruct the person to empty their pockets and put the contents onto a shelf which the operator can view either through a transparent wall or via a video camera, and then pass through the detector again. Alternatively the operator may require removal of certain clothing or other articles. If the operator is satisfied that the individual does not have a weapon, the operator may provide at least one input to the operator terminal so as to enable the inner entry door to unlock and the person have access to the facility.

In some embodiments before a person may open the outer entry door, they may need to be identified as someone authorized to access the facility such as by reading of data from a card or other article through operation of a reading device that is accessible externally of the structure. Alternatively or in addition, the user may provide other inputs to at least one input device. Thus in some embodiments access to the entry passage may be restricted to persons that have been identified. As later discussed, in other embodiments all individuals may be enabled to pass into through the entry door.

The sensors in the entry passage sense the person in the multiple positions in the entry passage. When the person passes through the detector and there is no indication of a weapon, the operator terminal or other connected control unit will operate to cause the inner entry door to change from a locked to an unlocked condition. Thus a user is enabled to pass out of the entry passage into the interior area of the facility.

Alternatively in some embodiments, the person may present data from the card or article and/or identifying inputs after having passed into the passageway and/or having passed the detector. In such embodiments the user may be enabled to pass out of the entry passage responsive to being identified through comparison of the received data with data that identifies the person as one that is authorized to enter the area or facility.

Likewise in an exemplary embodiment persons wishing to exit the facility can open and pass through the inner exit door into the walled exit passage. In some embodiments users wishing to exit may be required to have data read from a card or article and/or provide inputs so as to identify the particular individual. In such cases, the unlocking of the inner exit door occurs responsive to a predetermined relationship between the data that is read and data for a person who has been authorized by the system to exit from the area or facility.

Regardless of whether a user needs to be identified as authorized to exit through the inner exit door, the inner exit door will then change from unlocked to a locked condition once the person is sensed by the sensors as being in the exit passage. Under normal conditions as the person approaches the outer exit door, the lock controlling that door will unlock so as to enable the person to exit from the exit passage. As can be appreciated, by controlling the locks of the doors so as to avoid a fully open passageway into the facility, entry by robbers or other unauthorized persons through the exit passage is prevented.

In the exemplary embodiment the operator terminal is operative to provide output images on the display, each corresponding to the field of view of a camera which when no person is present includes at least a portion of one of the doors. The output image includes a border along at least one side thereof and preferably on multiple sides thereof. The visual appearance of the border is operative to change visual appearance in response to the condition of the lock associated with the particular door shown in the field of view. In the exemplary embodiment the border changes between red for a locked condition, to green for an unlocked condition of the associated lock. Thus an operator of the operator terminal can observe the operation of the structure and observe how the doors and locks are operating.

In the exemplary embodiment of the operator terminal, a graphical representation of the structure is also provided. The graphical representation also includes a representation showing the position of individuals as sensed by the sensors as they pass through the structure. The exemplary graphical representation also includes visual output indicators which indicate an alarm condition such as when the at least one detector has detected the condition corresponding to a weapon.

Such indicators may also indicate an entry by an individual who is not authorized to enter the facility or area, such as by data read from an associated record and/or input for the presence of an individual who does not have a data bearing record or other proper authorization to enter the facility.

In addition in some exemplary embodiments the graphical representation of the structure includes input devices corresponding to the locks on each of the doors. These input devices include icons on a touch screen display of the operator terminal. The terminal operator user is enabled to manually change the condition of selected locks by providing a touch input to the area of the display including one of the icons. Thus for example, if a person who desires to enter the facility is in a wheelchair, the terminal operator can open the inner entry door despite the detector sensing metal in the user's wheelchair that might otherwise suggest that they have a weapon. Further in some exemplary embodiments additional input devices in the form of touch screen icons are provided so as to enable an operator to receive indications and to change conditions of various components or devices. This includes, for example, the ability to turn off or mute the audible annunciator for the detector to enable police or armed cash carrying guards to enter the facility without setting off the alarm. Alternative embodiments also enable the doors to open in the event of certain conditions such as a fire. Of course these features are exemplary and in other embodiments other approaches may be used.

DETAILED DESCRIPTION OF EXEMPLARY EMBODIMENT

Figure 1:
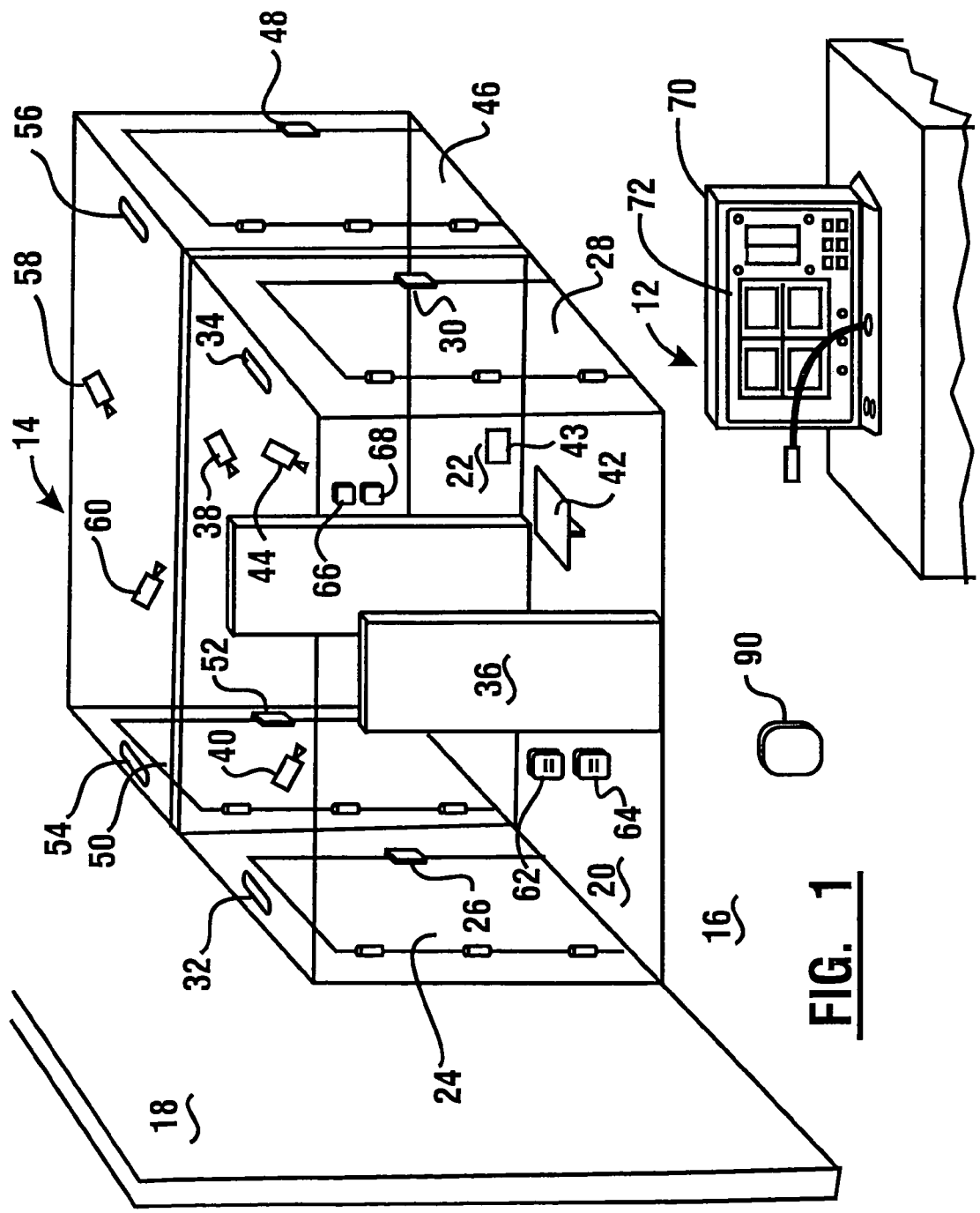
FIG. 1 is an exemplary schematic view of an apparatus of an exemplary embodiment.
Figure 2:
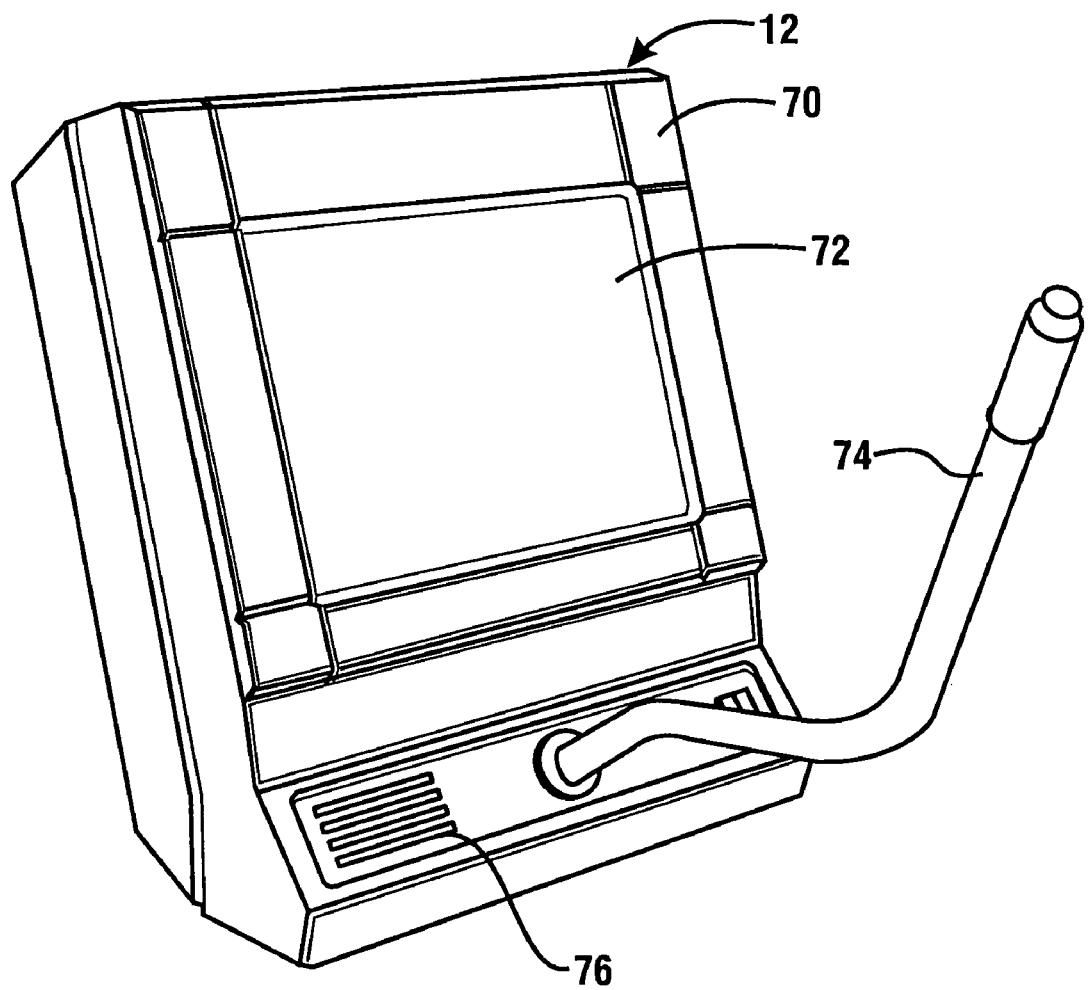
FIG. 2 is an isometric view of an exemplary operator terminal.
Figure 3:
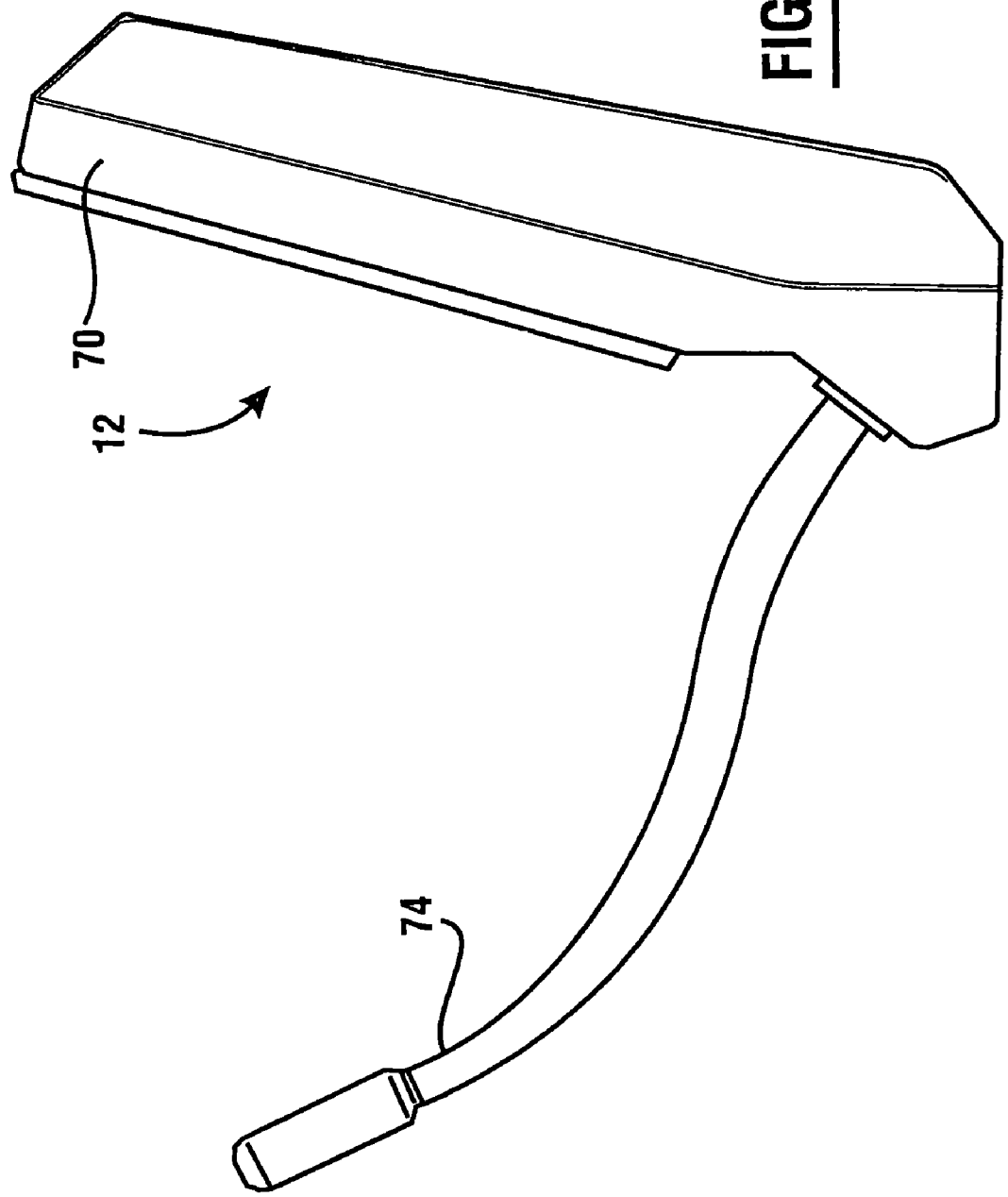
FIG. 3 is a left-hand view of the exemplary operator terminal shown in FIG. 2.

Referring now to the drawings and particularly FIG. 1, there is shown therein an exemplary apparatus generally indicated 10. Apparatus 10 includes an operator terminal 12. Operator terminal 12 of the exemplary embodiment operates to provide human perceivable indications such as visible and audio outputs to operators. Operator terminal 12 operates to control functions associated with components of a structure generally indicated 14. Structure 14 of the exemplary embodiment is used to control personnel access to and the exit of personnel from a facility such as an interior area of the building or other structure generally indicated 16. A wall 18 is shown bounding the interior area. As can be appreciated, wall 18 may be an exterior building wall, an interior building wall or other suitable barrier that prevents entry and exit from the interior area of the facility other than through the structure 14.

The exemplary structure 14 is comprised of a plurality of walls which form an entry passage 20 and an exit passage 22. The panels which bound the entry and exist passages of the exemplary embodiment are generally continuous so as to assure that the passages can generally be entered or exited only through the door openings at each of the respective ends. Further in the exemplary embodiment the walls bounding the entry and exit passages are comprised of transparent material. The exemplary transparent material is bullet resistant glass or suitable plastic which cannot be readily broken by bullets or other devices commonly used by criminals. The bullet resistant glass or other transparent materials facilitate observation of persons within the passageways by individuals such as a terminal operator, guards or others within the interior area. This ability to observe individuals entering and/or exiting the facility facilitates maintaining security within the facility.

In the exemplary embodiment the structure includes an outer entry door 24. The outer entry door may be opened by a person on the outside of the wall 18 to enter the entry passage. The condition of the outer entry door is controlled by an outer entry door lock 26. The outer entry door lock is an electrical lock which is selectively changeable between the locked and unlocked conditions. In the locked condition of the door the door 24 is closed and remains closed by the lock. When the lock is in an open condition the outer entry door may be opened. The outer entry door lock is electrically controlled responsive to signals from a control unit. In exemplary embodiments the operator terminal may comprise the control unit. However, in other embodiments a separate control unit or multiple control units may be used for purposes of controlling the condition of the outer entry door lock as well as other locks and other components as later discussed herein.

The entry passage further includes an inner entry door 28. The inner entry door when open enables a person to move between the entry passage and the interior area of the facility. The inner entry door is associated with an inner entry door lock 30. Like the outer entry door lock, the inner entry door lock is electrically changeable between locked and unlocked conditions responsive to electrical signals from a control unit.

The entry passage further has associated therewith a plurality of entry passage sensors schematically represented 32 and 34. The sensors are components operative to sense persons in a plurality of locations in the entry passage. In the exemplary embodiment the sensors are infrared sensors that are operative to sense a person in a position within the passage adjacent to the outer entry door as well as a person in a position in the entry passage adjacent to the inner entry door. Of course it should be understood that these sensors are exemplary and in other embodiments other sensors may be used to detect persons in each of numerous locations. These may include, for example, photo sensors, weight sensors, sonic sensors, inductance sensors or other sensors that can detect persons in various locations in the entry passage.

The exemplary embodiment further includes a detector 36 in the entry passage. The detector of the exemplary embodiment comprises a weapon detector. The detector may comprise one or multiple types of sensors and other devices including circuits, processors, interfaces, data stores, data and instructions that can identify probable weapons. In the exemplary embodiment the detector comprises a metal detector that is operative to detect metal objects being carried by a person passing through the entry passage. Such metal objects may correspond to a gun or knife or other weapon that a person may be attempting to bring into the facility. It should be understood that while this particular type of detector is merely exemplary, other embodiments may use different or other types of detectors for purposes of identifying objects or individuals that are not permitted within the facility. These may include, for example, aroma sensors, x-ray sensors, radio frequency sensors, biometric sensors, weight sensors, image analysis sensors or combinations thereof. In some embodiments the sensor may include body scanners that produce images of bodily structures and items covered by clothing and/or in body cavities, and one or more processors that carry out executable instructions to conduct image analysis to identify structures in images that have a significant probability to correspond to a weapon. It will be appreciated that the nature of sensors will depend on the nature of the facility and the risks that are sought to be prevented through operation of the structure.

The exemplary embodiment further includes a camera 38. Camera 38 has a field of view that normally (when a person or other object is not present in between the camera and the door) includes at least a portion of the outer entry door 24. The exemplary embodiment further includes a camera 40. Camera 40 has a field of view that normally includes at least a portion of the inner entry door 28. Thus in the exemplary embodiment camera 38 is operative to capture images corresponding to persons entering the entry passage and/or at the entry end thereof. Likewise camera 40 is operative to capture images of persons at the inner side of the entry passage or entering through inner entry door 28.

In the exemplary embodiment the entry passage further has positioned therein a shelf 42. Shelf 42 may be used in a manner as later explained by persons who are removing items from their person for observation. In addition the exemplary embodiment includes a camera 44 which is positioned to have a field of view that includes items that may be placed on the shelf. Of course it should be understood that this arrangement is exemplary and other arrangements may include additional or different elements and features to observe and monitor persons and items in the passage.

Further in exemplary embodiments, the entry passage has accessible therein, a reader 43. Reader 43 is operative to read data bearing records which include data thereon that can be used to identify an individual or persons within one or more categories of individuals. Such data bearing records may include, for example, magnetic stripe cards, RFID cards, inductance cards, smart cards, optically encoded cards, tokens, near field communication chips, articles or other items that can be read to provide identifying information. The data read from such data bearing records may be read by reader 43 and compared through operation of at least one processor with data stored in at least one data store to determine if the data read from the record has a predetermined relationship with stored data. In this way the at least one processor determines if the read data is associated with a person authorized to access the facility or interior area. Such a processor and data store may be included in the operator terminal 12 or in another computing device or devices which are operative to hold such data.

Further in some embodiments an additional input device may be included for operation by individuals wishing to access the facility. Such an input device may include, for example, key pads, fingerprint readers, iris scanners, cameras, or other devices which can be used to receive further identifying inputs associated with individuals or categories of individuals. Data input through such input devices may be compared through operation of one or more processors with stored data and/or with data read from the data bearing record presented by the individual for a predetermined relationship. Correspondence or other predetermined relationship of the input data with stored data and/or with data read from the data bearing record, causes at least one processor to make a determination that the person is authorized to access the facility. The processor may then operate to cause the inner entry door 28 to be unlocked.

For example, in some embodiments such as controlling access to a banking facility, the user wishing to access the facility may utilize their debit card such as an ATM card to provide data which can be read by the reader 43. The user may also input through a key pad positioned in the entry passage adjacent to the reader, a personal identification number (PIN) that would normally be used for accessing their account. The at least one processor may operate to verify that the data read from the card corresponds to data for an authorized bank customer. The at least one processor may also determine that the input PIN data corresponds to that card or customer. In response to the determination by the at least one processor of correspondence between the user input data and stored data for an authorized user, the at least one processor may operate to cause the inner entry door to be unlocked.

Alternatively in some embodiments other types of devices may be used for receiving data from data bearing records. For example an authorized user's portable device such as a smart phone may include data therein that is operative to identify the particular user. In such embodiments the user may have their cell phone programmed with data that identifies the particular user as an authorized user. This may include, for example, identifying data from the phone such as data that can be provided via RF communications such as Bluetooth or near field communication. The identifying data may be read through operation of the reader and then compared through operation of at least one processor with data corresponding to authorized users. Alternatively and/or in addition, further input may be received for purposes of identifying the particular user. This may include, for example, key pad inputs to an external device, inputs through the phone, biometric inputs such as facial recognition, fingerprint reading, voice print or other identifying data or other factors that can be compared or analyzed for purposes of determining that the person is authorized to access the particular area or facility. Of course these approaches are exemplary. Further, it should be understood that in some embodiments the requirement for such authorization of individuals to enter the facility may not be required and/or may only be required during certain time periods such as during off hours or at times that may be computer determined, such as when security guards are otherwise not present within the interior area of the facilities. Of course these approaches are exemplary and in other embodiments other approaches may be used.

In the exemplary embodiment the structure 14 further includes an inner exit door 46. The ability to open inner exit door 46 is controlled by a lock 48. Lock 48 of the exemplary embodiment is an electrically controlled lock, the condition of which is controlled by the operator terminal or other associated control unit. Exit passage 22 further includes an outer exit door 50. Outer exit door 50 further has associated therewith an outer exit door lock 52. The outer exit door lock of the exemplary embodiment is electrically controlled and changeable between locked and unlocked conditions responsive to electrical signals from the operator terminal or other associated control unit.

The exemplary structure has in the exit passage sensors 54 and 56. Sensors 54 and 56 may be similar to sensors 32 and 34 and suitable for detecting persons in positions in the exit passage. Again, different types and numbers of sensors may be used in embodiments which apply the principles described herein.

A camera 58 is directed so as to have a field of view that normally includes a portion of the outer exit door 50. Likewise a camera 60 is positioned to have a field of view that normally includes a portion of the inner exit door 46.

In the exemplary embodiment the entry passage includes a microphone 62 and a speaker 64. The microphone and speaker enable operators to communicate with persons in the entry passage through the operator terminal. In the exemplary embodiment the exit passage 22 also includes a microphone 66 and a speaker 68 so as to enable communications with persons therein.

In some embodiments, the ability to enter into the exit passage and/or the ability to exit from the exit passage may be controlled responsive to the input of data from data bearing records and/or through other input devices in a manner like that previously discussed in connection with the entry passage. Thus for example a user may present a card, token, phone or other data bearing record which is read through operation of a reader either in proximity to the exit door 46 or within the passage for purposes of reading data therefrom and/or may provide inputs of various types so as to provide data that can be used for purposes of a processor making a determination that the person is authorized to exit from the facility. Of course it should be understood that in some embodiments the features that require the identification of individuals exiting the facility may not be used. Further it should be understood that in some embodiments individuals may be required to provide identifying data upon entry to the facility but not for purposes of exiting the facility or vice versa.

Figure 4:
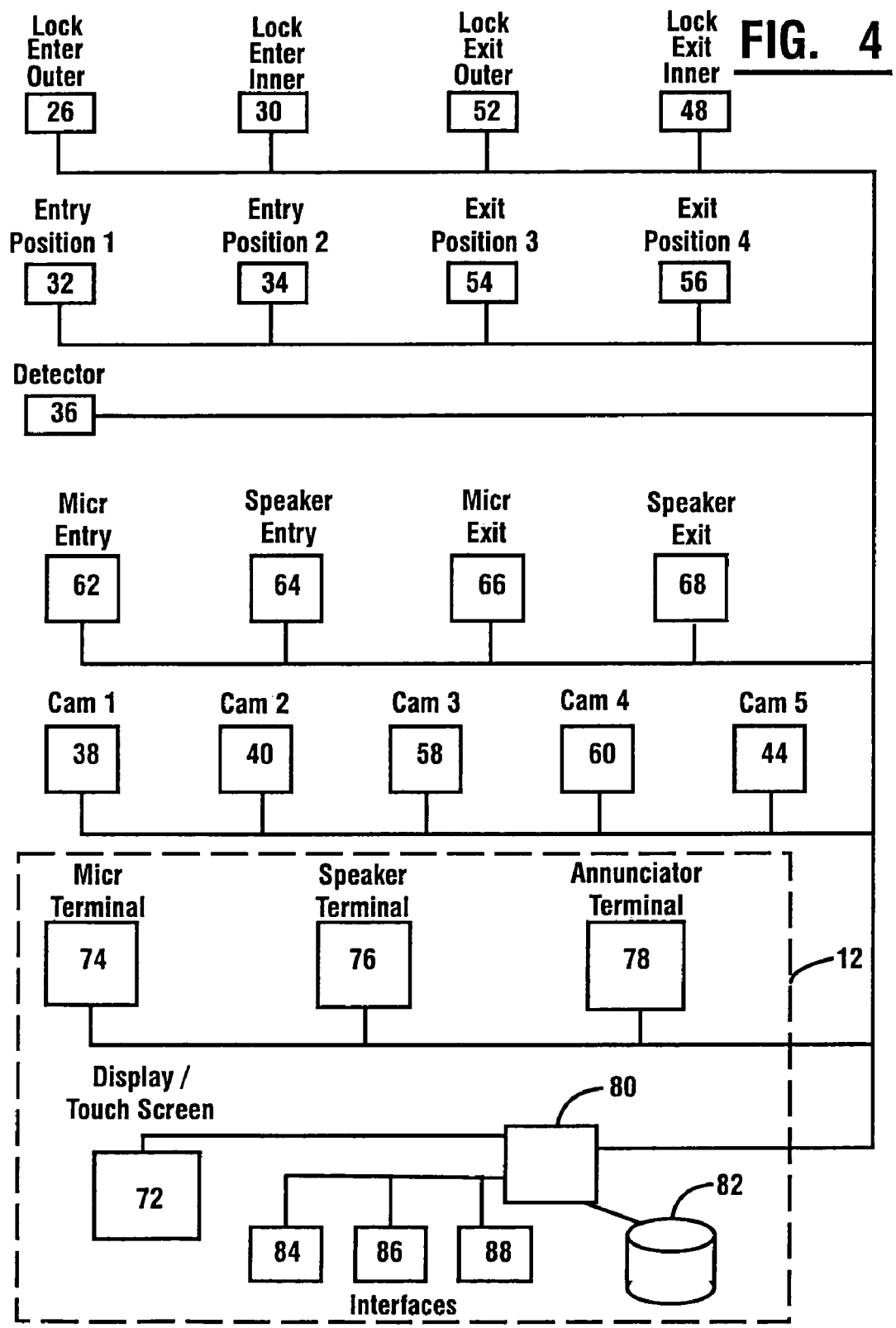
FIG. 4 is a schematic view of the electrical architecture of the apparatus.

In the exemplary embodiment the operator terminal 12 includes a housing 70. The operator terminal further includes a visual display 72. In the exemplary embodiment the visual display includes a touch screen display so that the display can provide both visual outputs and receive inputs manually provided by users touching areas of the display. The exemplary operator terminal further includes a microphone 74 and a speaker 76. The microphone and speaker can be used by an operator to selectively communicate with persons in the entry and exit passageways through the corresponding microphone and speakers located in such passageways. Further as schematically represented in FIG. 4, the exemplary operator terminal includes at least one audible annunciator schematically represented 78. In the exemplary embodiment the one or more audible annunciators may include a buzzer, horn or other suitable output device to provide audio outputs so as to draw the terminal operator user's attention to the detection by the terminal of particular conditions. Of course it should be understood that in other embodiments a speaker may perform both the functions of an annunciator as well as to communicate with persons located in the passages of the structure. As can be appreciated in the exemplary embodiment the operator terminal is capable of providing both visual and audible outputs to operators in connection with the functions carried out through the terminal as discussed herein.

Further in the exemplary embodiment shown in FIG. 4, the operator terminal includes at least one processor schematically indicated 80. The at least one processor may include one or several processors that are operative to execute instructions included in computer programs that are stored in one or more data stores schematically indicated 82. Such data stores may include media such as a hard disk drive, flash memory, CD, or other suitable local or remote media for bearing computer executable instructions. In the exemplary embodiment the at least one processor executes instructions that are operative to control the condition of the locks and other components associated with the structure. The at least one processor is also operative to cause the terminal to provide the visual and audible outputs through a display terminal, and to receive the inputs from the user of the display terminal.

In some embodiments the at least one data store 82 may include data corresponding to data that can be read from data bearing records associated with authorized individuals or categories of individuals and/or inputs that are provided to identify individuals. The at least one processor may operate to compare data corresponding to data read by reader 34 or other devices and/or input data with such stored data for a predetermined relationship, and thereby operate to determine if a user is authorized to enter and/or exit the facility and/or area to which access is controlled.

Of course it should be understood that in other embodiments one or more separate control units associated with the structure and the display terminal may be provided so as to provide some of the functions that are described herein as carried out through the operator terminal of the exemplary embodiment.

The exemplary operator terminal further includes electronic interfaces 84, 86 and 88. The interfaces may provide communication with other types of systems and devices associated with operation of the system and/or the operator terminal. For example an interface may provide communication with a fire alarm system so as to receive a signal indicating a fire condition within the facility. In response to receiving such a signal, the at least one processor 88 may operate in accordance with its programming to cause locks 26, 30, 52, 48 to change to the open condition so as to facilitate personnel exiting the interior area. Alternatively an interface may provide remote communication to other facilities. This may be done, for example, to monitor remotely activities that are ongoing at the facility. This may include for example, features like those described in U.S. patent application Ser. No. 11/825,616 filed Jul. 6, 2007, the disclosure of which is incorporated herein by reference in its entirety. Still other interfaces may communicate with remote systems for tracking the whereabouts of individuals who may be entering or leaving the facility.

In still other exemplary embodiments an interface may be provided for wireless communication with a portable device. Such a portable device which is schematically indicated 90 in FIG. 1 may include a display, processor, data store, wireless communication interface and/or other input and output devices. Such a portable device may enable an operator to receive outputs and/or provide inputs that would otherwise be received or provided through the operator terminal. In this way an operator carrying the portable device may provide controlling inputs even when they are located at other locations within the facility. The portable device may operate to communicate via signals transmitted and received through an infrared or radio (RF) interface, for example. The portable device may in some embodiments include a cell phone, such as a smart phone. The portable device may provide some or all the capabilities of the operator terminal and may operate the devices of the structure in a similar manner. For example, a smart phone with a touchscreen could be used in a manner similar to the terminal interface.

Of course it should be understood that these devices and arrangements are exemplary and in other embodiments other approaches may be used.

Figure 5:
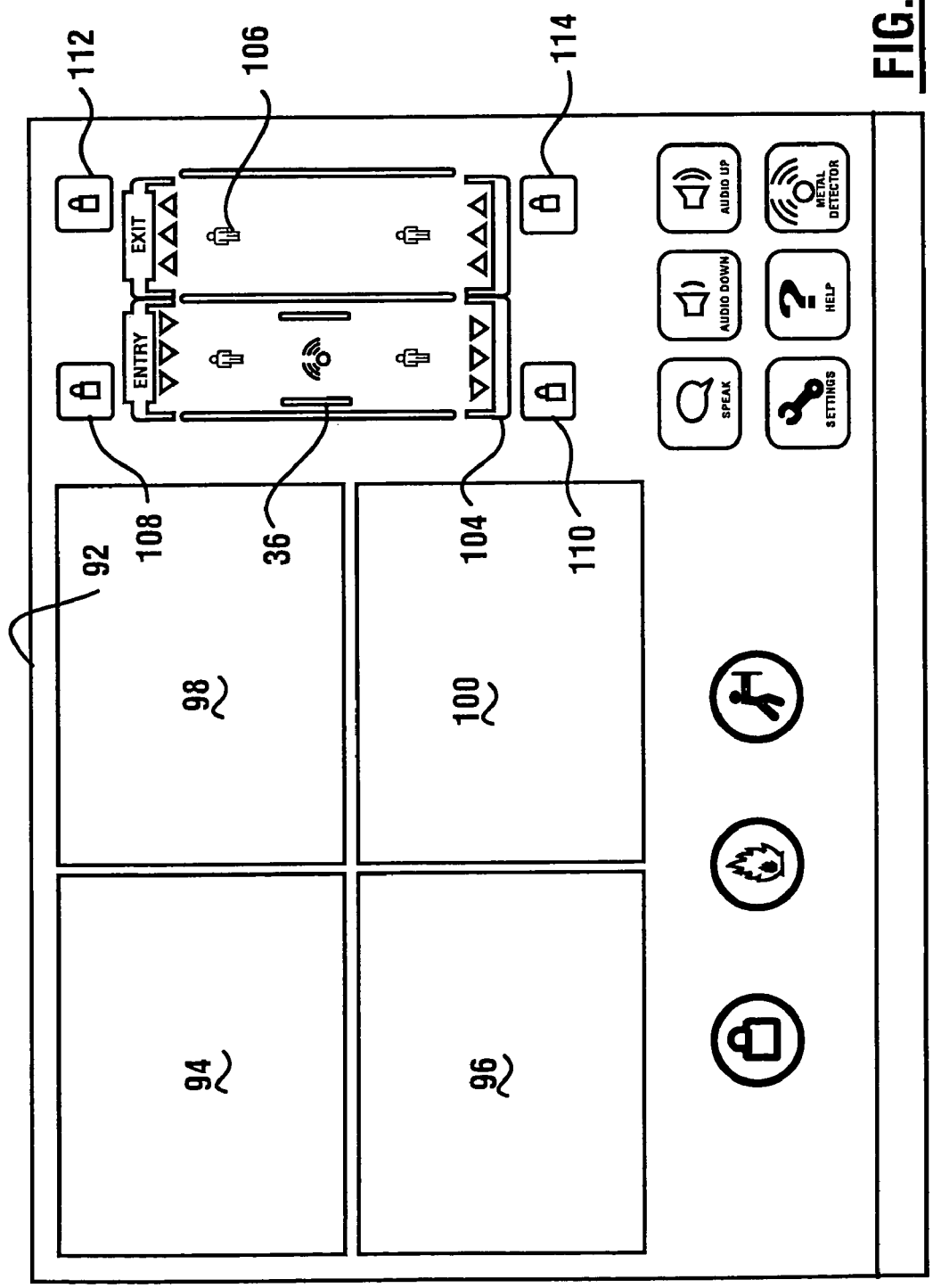
FIG. 5 is an exemplary display output of an operator terminal.

FIG. 5 shows an exemplary visual display output from the operator terminal 12. The exemplary display 92 comprises a touch screen display as previously discussed. The display 92 includes four output images 94, 96, 98 and 100. In the exemplary embodiment images 94, 96, 98 and 100 correspond to the field of view of cameras 38, 40, 58 and 60 respectively. As shown in greater detail in FIG. 6, each of these output images is operative to show individuals and/or activity in the respective area of the corresponding door. Specifically output image 94 shows the area of the outer entry door. Output image 96 shows the area of the inner entry door. Output image 98 shows the area of the outer exit door and output image 100 shows the area of the inner exit door.

Figure 6:
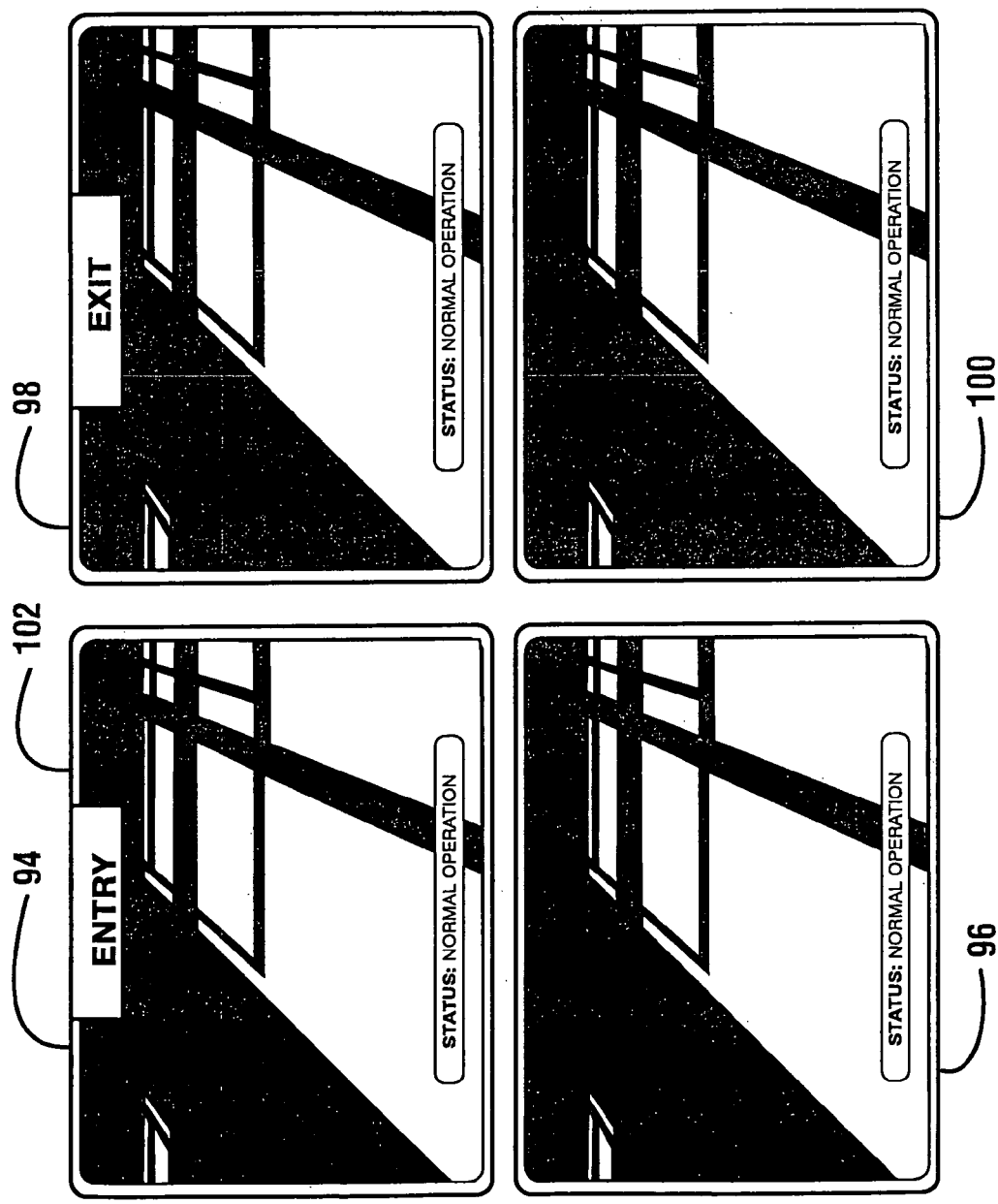
FIG. 6 is an exemplary output of a portion of the display associated with images from cameras associated with the structure.

As indicated in FIG. 6, each of the output images has indicia associated therewith that includes a border that extends adjacent to at least one side of the output image. This border in the exemplary embodiment extends about all four sides of the image. For image 94, the border is 102. As shown in FIG. 6, each of the images has a border.

In the exemplary embodiment the at least one processor in the operator terminal operates to cause the border associated with each image to undergo a visual change in response to a change in condition of the associated lock. In the exemplary embodiment for example, when the outer entry door lock 26 is in a locked condition, border 102 is red. When the lock 26 changes so as to be in an unlocked condition, the visual appearance of the border 102 changes to green. In the exemplary embodiment each of the borders undergo a visual change in appearance with changes in the condition of corresponding lock. Of course it should be understood that this indicia and approach to providing a visual indication of a change in the locked condition is exemplary and in other embodiments other indicia and/or visual changes may be used to indicate a change in condition. These changes could include changes other than color changes in the image and may include, for example, textual or symbolic indicators. Of course these approaches are exemplary and in other embodiments, other approaches may be used. Further it should be appreciated that while in the exemplary embodiment four images are used, other embodiments may include lesser numbers of images or additional images.

Figure 7:
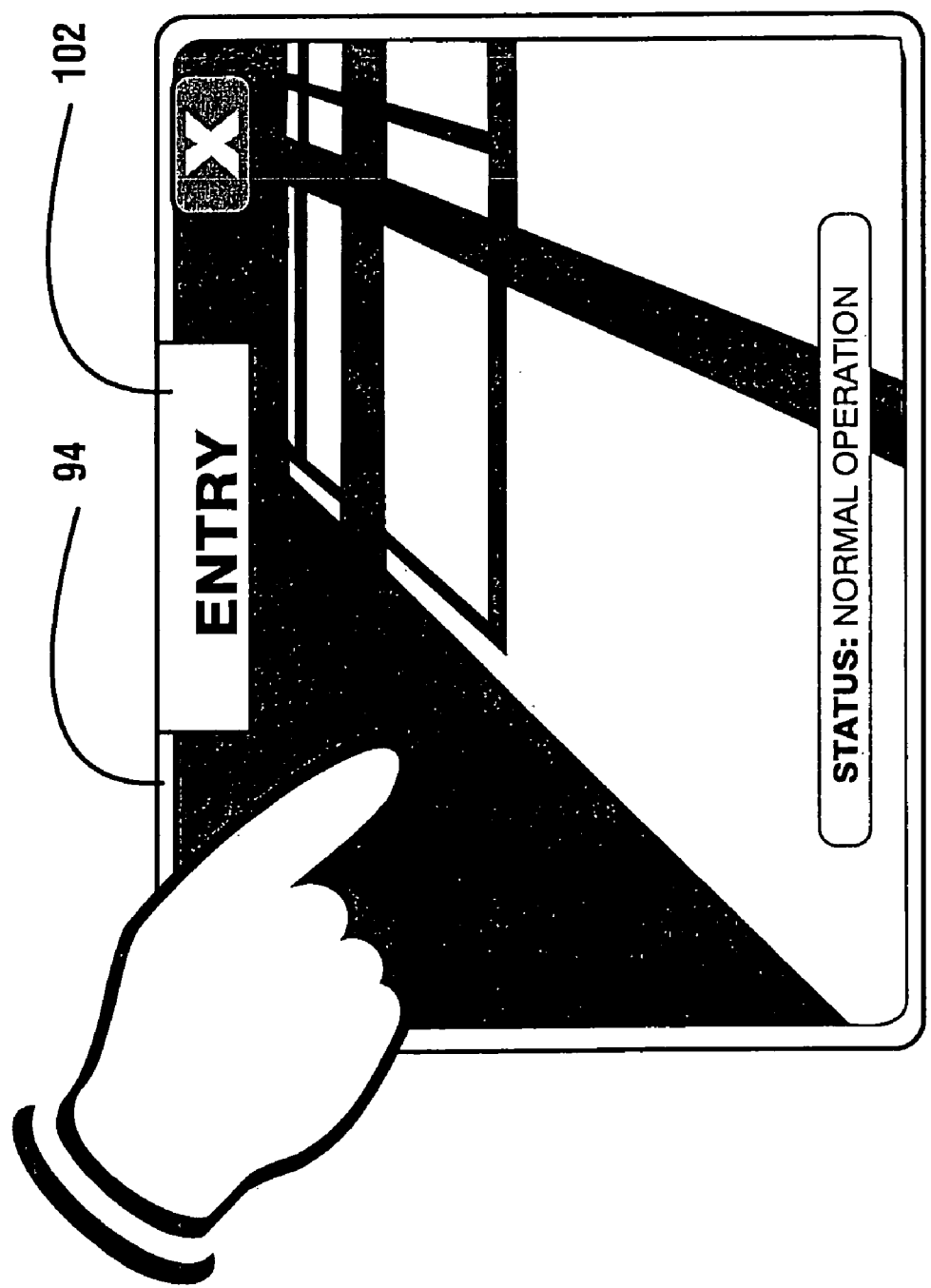
FIG. 7 is an exemplary view as output from the display with a particular image enlarged in response to the manual input.

In the exemplary embodiment the at least one processor associated with the display terminal also provides the capability for a user to provide at least one input to the touch screen so as to obtain a larger output image of a field of view of a particular camera. For example as represented in FIG. 7, an operator touching output image 94 causes the image to enlarge so as to occupy the space previously occupied by all of images 94, 96, 98 and 100. Likewise in the exemplary embodiment the user's touching of the "x" causes the image to return to its smaller size.

In still other embodiments cameras may be provided with automated controls for panning, tilting or zooming capability. Touching of the screen by a user may enable the user to control each respective camera so as to modify the field of view and/or to zoom in or out in areas of particular interest. For example if an operator wishes to zoom in on a particular item that a user may be carrying, touching the screen in ways that provide manual inputs enables the user to select and/or enlarge particular areas of interest. This may be done in various ways of providing inputs corresponding to different icons or other arrangements suitable for purposes of providing inputs that can be used to control outputs from the display. This could include for example, the processor operating to point the camera toward the area that the user touches on the touchscreen. The area of interest could be enlarged responsive to the user placing two fingers in contact with the screen and then spreading the fingers apart. Alternatively images could be made to reflect a wider field of view by placing two fingers in contact with the screen and moving the fingers closer. The associated one or more processors may be programmed to respond to various inputs.

Further in exemplary embodiments inputs may be provided so as to enable a user to sequentially select various cameras for viewing. This may enable an operator, for example, to provide inputs and operate the terminal to view items that the person has removed from their pockets or otherwise placed on the tray 42 in the entry passage. Alternatively in some embodiments the terminal can output images corresponding to a body scan, including structures underlying clothing or in body cavities. Views may be provided of selected regions or items that may have been identified by a computer analysis of image data as a possible weapon. Of course these approaches are exemplary and in other embodiments other approaches may be used.

In the exemplary embodiment the screen 92 further includes a graphical representation of the structure generally indicated 104. As shown in FIG. 5, the exemplary graphical representation includes a representation of the entry passage, and exit passage that further includes a graphical representation of each person sensed in a particular position as sensed by the sensors 32, 34, 56 and/or 58. Thus the graphical representation shows the location that each person sensed in each of the entry and exit passages.

The exemplary embodiment further includes a visual representation of the one or more detectors 36 as well as an indication of when the detector is in an alarm condition. For example when the detector is in an alarm condition, the operator terminal may provide a flashing indicator output in the area of the graphical representation of the detector. The operator terminal may also provide an audible output that will alert an operator to the fact that the detector has detected a condition which corresponds to a possible weapon and that the person in the entry passage has been stopped from passing into the interior area of the facility. Of course these approaches are exemplary.

The exemplary embodiment further includes visible features including icons 108, 110, 112 and 114. Icon 108 corresponds to lock 26 on the outer entry door. Likewise icon 110 corresponds to lock 30 on the inner entry door. Icon 114 corresponds to lock 48 on the inner exit door, and icon 112 corresponds to lock 52 on the outer exit door. As can be appreciated, the arrangement of the icons in the graphical visual representation correspond to physical locations of the locks in the structure. The graphical representation also corresponds to the arrangement of output images in the display.

In the exemplary embodiment each of the icons 108, 110, 112 and 114 comprise a part of input devices. An operator at the operator terminal is enabled to provide a manual input by touching an icon, which causes the at least one processor to cause the then current condition of the corresponding lock to change. Further in the exemplary embodiment the at least one processor operates the display to cause a change in the visual characteristics of the icon so as to reflect the then current status. For example in the exemplary embodiment a lock that is in a normally locked condition may be represented by an icon that includes a visual representation of a locked padlock. Further in an exemplary embodiment such an icon may be red. An operator who wishes to change the condition of the lock from the locked condition to the unlocked condition may provide a manual input by touching the icon. Touching the icon in the exemplary embodiment causes the icon to change to a visual representation of an open padlock. Further in the exemplary embodiment the icon changes from the red visual condition corresponding to locked, to the green visual condition corresponding to an unlocked condition. Of course it should be understood that these icons and visual changes are exemplary and in other embodiments, other changes involving graphical representations, textual representations or other indicia or representations user inputs may be used. Alternatively in some embodiments user inputs may be provided by sensing an operator's eye movements. This may be done using features like those described in U.S. patent application Ser. No. 12/800,184 filed May 10, 2010 the disclosure of which is incorporated herein by reference in its entirety.

Further in other embodiments other types of input devices may be provided so as to change the locking conditions. In addition in the exemplary embodiment it should be understood that the graphical lock representations as represented in the display correspond to the default condition of the lock. For example a lock that is represented as locked, may still unlock during normal operation of the structure as it is controlled responsive to the operator terminal. Thus for example if the operator wanted the lock 26 associated with the outer entry door 24 to always be open, an operator could provide inputs through icon 108 so as to change the condition of the door so as to always be in an unlocked condition. This may be done, for example, in some exemplary embodiments so as to always enable a person in the entry passage to leave the entry passage through the outer entry door. Thus for example a person who has a weapon and who enters the entry passage causing the detector to detect the weapon, is allowed to exit and run away. Some operators may find this to be desirable rather than operating the structure so as to capture the individual with the weapon within the entry passage. Likewise in other circumstances operators may choose to open multiple doors so as to allow a crowd to exit from the facility such as during a fire alarm or during other circumstances. Of course it should be understood that these circumstances and approaches are exemplary.

Further in the exemplary embodiment other visual features including icons are included on the exemplary screen outputs. For example, icons included in the exemplary graphical representation of the structure include icons to enable an operator to use the microphone of the operator terminal to communicate with persons in the selected passage as well as to adjust the output volume of the operator terminal up or down. Other icons allow adjusting of settings which may include changing the output characteristics or visual images output from the display or changing other aspects of the output or controller device. Other exemplary icons represented include an icon used to request help so as to obtain explanations of operator terminal functions. A further representative icon enables changing of settings of a metal detector. Of course it should be understood that these particular icons and capabilities are exemplary, and in other embodiments other approaches may be used.

Further icons shown in the area of the exemplary display in an area below the output images include icons which a user can manually or otherwise select to cause the operator terminal to control certain functions and capabilities of the system. This includes, for example, a lock icon. Touching this icon in an exemplary embodiment enables a user to change the conditions of all locks with a single input. Another icon which includes a visual representation of a flame can be used to provide an output indication of a signal from a fire alarm system. Alternatively or in addition, a manual input to this icon may be used to open the locks as appropriate in the event of a fire alarm condition.

Still other exemplary visual features such as icons may represent a sensing situation where doors are opened in response to particular programmed conditions. For example in some exemplary embodiments when a person presses on a door as part of an attempt to exit for more than a set period of time, the exit door will thereafter open. This may be common for example in a situation where a person is attempting to escape from a fire condition or other conditions in the facility interior area. Of course it should be understood that these particular approaches and capabilities are exemplary and in other embodiments, other approaches may be used.

In still other embodiments the operator terminal or connected control unit may operate in a manner that includes features like those described in U.S. Pat. No. 7,533,806, the disclosure of which is incorporated herein by reference in its entirety. In some exemplary embodiments the at least one processor may operate to store data corresponding to images captured by the various cameras associated with the structure. This can be beneficial, for example, in capturing data corresponding to images captured by the camera at a time immediately preceding when certain events occurred or were detected. For example in some circumstances a person entering the entry passage may attempt to throw a weapon through the detector prior to their physical passage through the detector area. The at least one processor may operate in the manner of the incorporated disclosure so as to capture images of the user's activities and enable an operator to output those images through the display so as to detect what the particular person may have done.

In some embodiments data corresponding to such images may be stored on a relatively short term basis so as to capture activities prior to triggering events as well as subsequent to triggering events. Such relatively short term storage can be used to minimize the amount of data storage space required in order to capture and retain high resolution video as necessary for the time period to make a decision on whether to admit a person to the facility. Of course in alternative embodiments, such images may be stored on a longer term basis in one or more data stores. Alternatively such image data may be transferred through one or more of the interfaces to a connected system for storing such data. Of course it should be appreciated that while capturing image data associated with detection by the detector has been discussed, other events may be used as the basis for capturing image data including the opening of the various doors, facial features of individuals, clothing worn by individuals, the configuration of objects being carried by or within individuals, or other features or conditions which may be detected and used as the basis for triggering an event which results in capturing and/or analyzing image data. In addition or in the alternative, the system may operate to store records of event data related to operation of the structure and/or the operator terminal. This may include data corresponding to all or some entry, exit and/or detected weapons events. Such event data may be correlated with captured image data or may be maintained separate therefrom.

Further, in other exemplary embodiments data corresponding to audible communications between operators and individuals passing through the structure may be stored and captured in one or more data stores. In this way a record can be kept as to communications between operators and individuals who pass into or out of the structure. Alternatively or in addition in some embodiments, data corresponding to both video and audible communications may be stored in one or more data stores through operation of the operator terminal or other connected devices. In this manner a complete record of entry and exit activity from the facility may be maintained for purposes of tracking events and persons going to and from the facility. This would provide capabilities such as identifying individuals who have entered or left the facility. This could be done using facial recognition capabilities, such as in the manner of the incorporated disclosures. It might also be done via sensing data from radio frequency identification (RFID) tags or other similar indicators on records or items carried by individuals. Of course these approaches are exemplary and in other embodiments other approaches may be used.

In still other embodiments the operator terminal may include in one or more data stores, data corresponding to audible outputs which would commonly need to be spoken by terminal operators. This may include for example instructions that could be output by the speakers in the passageways to instruct users to do common or routine things that may be required. For example if two people enter the entry passage, the operator may provide an input to an input device of the operator terminal which causes an output through the speaker in the entry passage, that advises that only one person may be in the entry passage at a time and one person must leave the entry passage. This way when a condition arises, the operator may cause output of that message into the vestibule without having to speak into the microphone, which avoids effort by the operator and a potential distraction to other people in the vicinity of the operator terminal. Likewise in some alternative embodiments data corresponding to audible instructions asking a person to remove items from their pockets and place them on the tray can be recorded in the at least one data store and output through the speaker in the entry passageway in response to at least one input through an input device by an operator. Thus a person who has triggered a metal detector, for example, may be instructed to empty the contents of their pockets onto the shelf, to step behind the metal detector and to pass through the metal detector again. As can be appreciated, various forms of audible instructions may be stored and selectively output in various embodiments.

In some embodiments at least one processor may be operative to cause audible outputs automatically without operator input or intervention. This may include, for example, the processor causing the audible output for instructing one person to exit the entry passage when two persons are sensed therein. Alternatively, the processor may cause output of the audible output telling a user to empty their pockets and place metal items on the tray when the detector senses metal on the person. Of course other approaches may be used.

Alternatively, or in addition in some embodiments the passage may include electrically controlled signs or displays. These signs or displays may be used to display messages to users. These messages may include text messages that correspond to the prerecorded message types previously discussed. Further, in some embodiments the messages may be output through liquid crystal type displays attached to the side walls. Such displays may include the capability of being controlled to selectively display characters or images, or to be transparent. In this way the displays will not interfere with the ability to view persons in the passageway.

Further in some embodiments the at least one processor may also operate to record statistical information and other information related to individuals entering and exiting the structure and/or facility. This may include, for example, how many people enter and/or exit the interior area during particular time periods. The at least one processor may also calculate how quickly various operators respond to different conditions that arise, and activities associated with handling certain events that may occur. In some embodiments the system may also include devices such as reading devices, access cards or other devices that operate to identify particular individuals. In such cases the system may operate to determine how long particular individuals remain in the facility and their particular activities when entering and exiting. Of course these approaches are exemplary and in other embodiments other approaches may be used.

Figure 8:
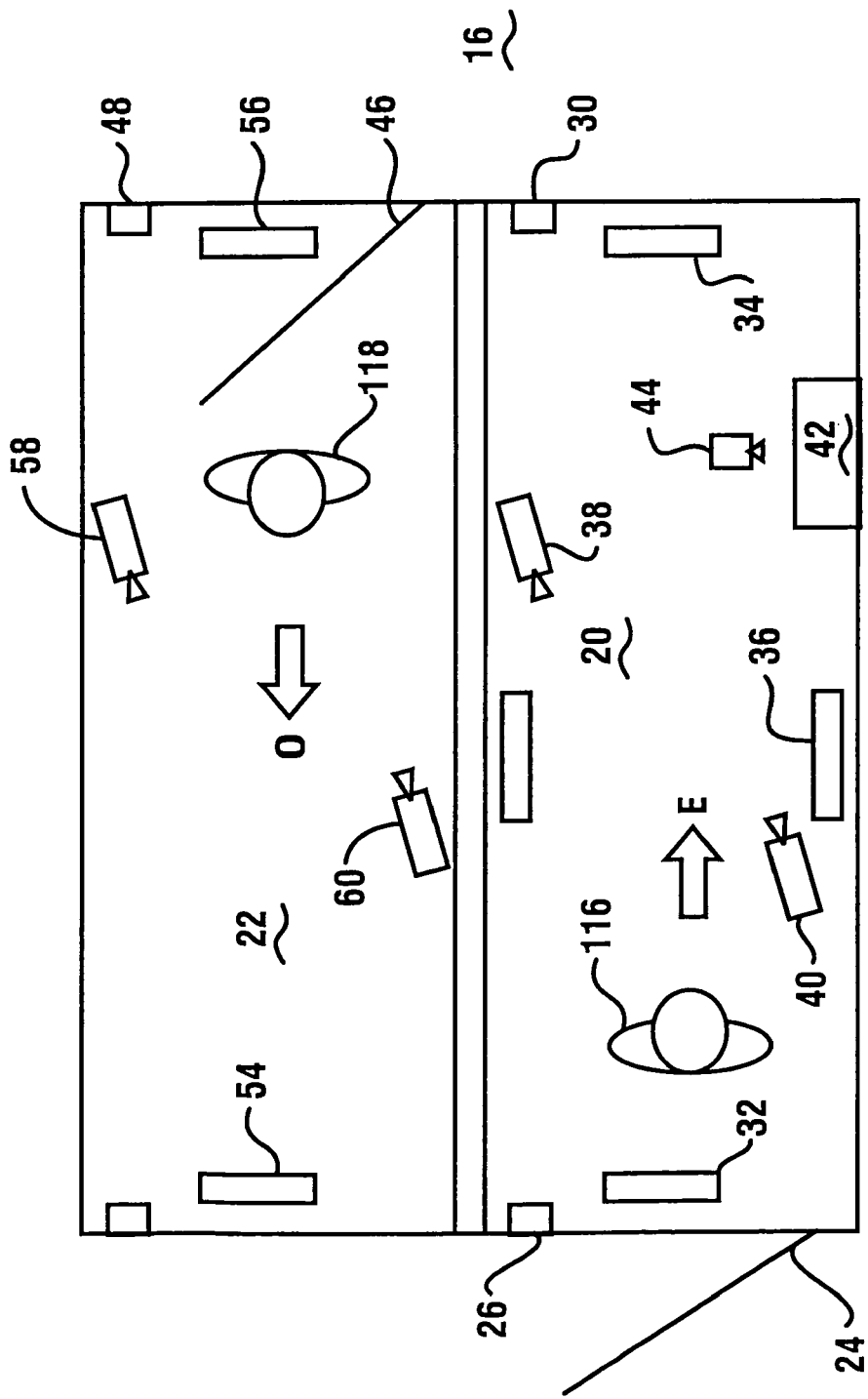
FIGS. 8-11 are schematic views showing passage of individuals through the exemplary structure during operation.
Figure 9:
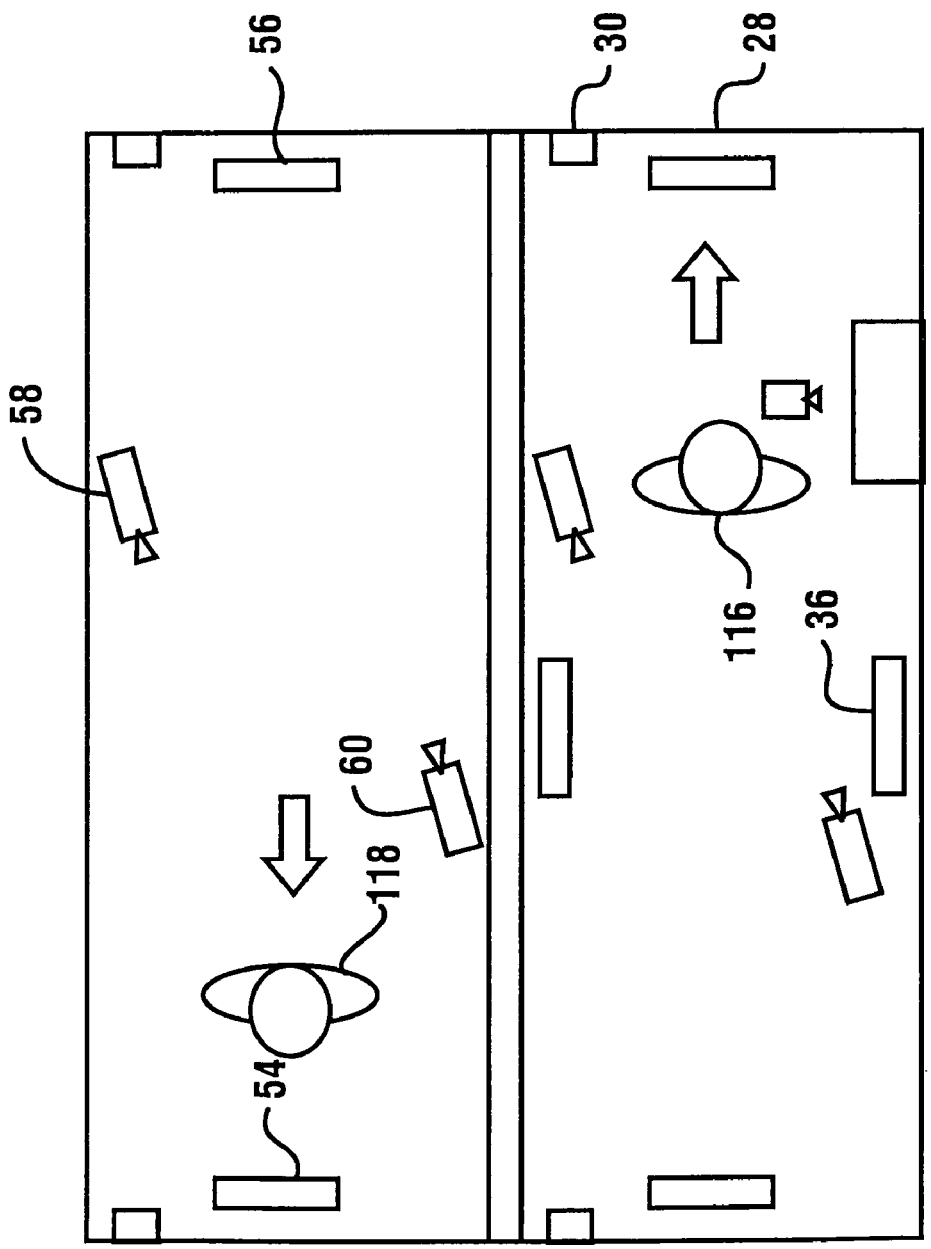
Figure 10:
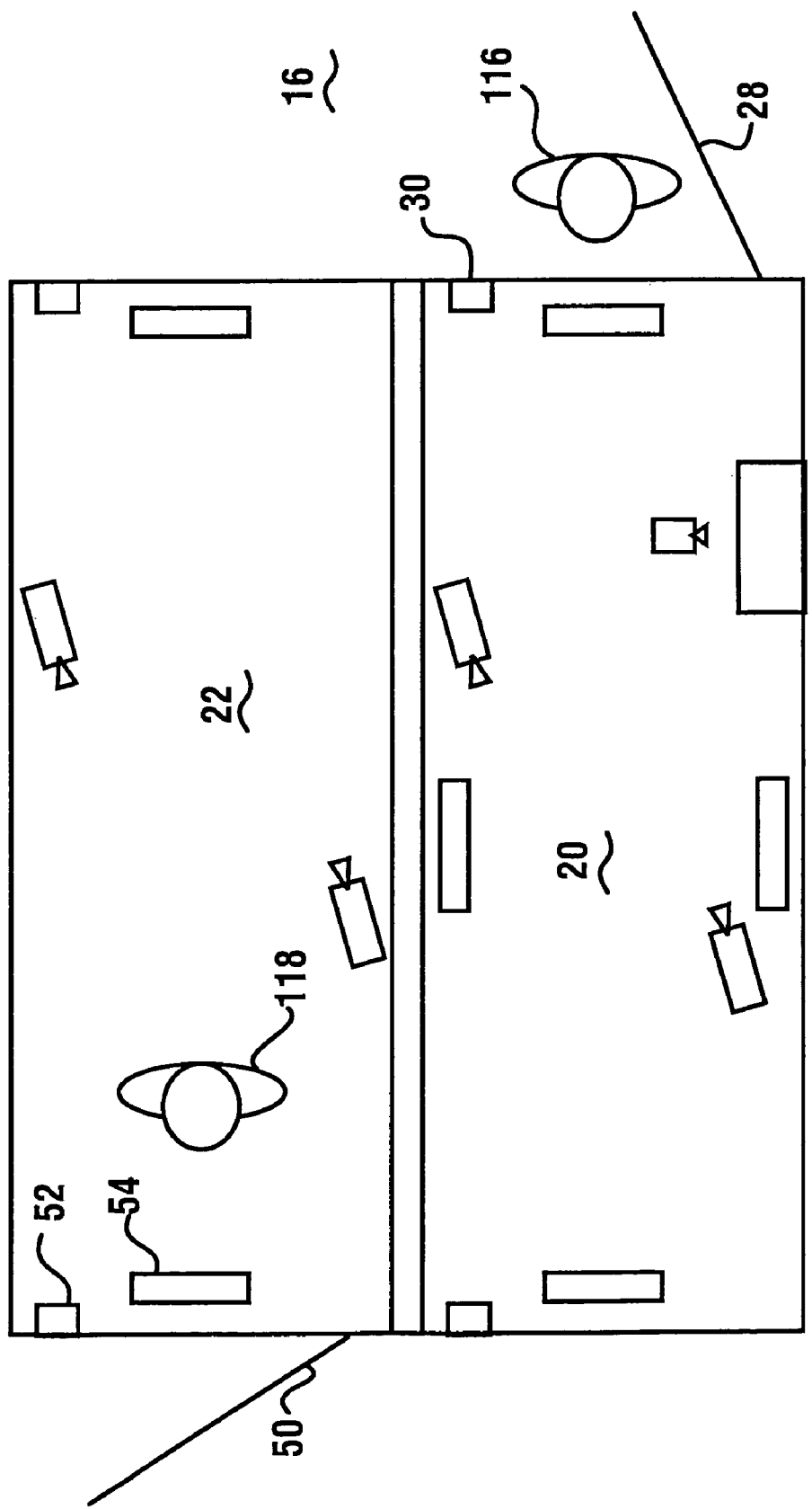

FIGS. 8-10 schematically represent the operation of the structure as controlled responsive to the operator terminal. In FIG. 8 an individual 116 is shown having entered the entry passage by opening the outer entry door 24. As the person moves in the direction of Arrow E, the outer entry door 24 closes and the person passes through the detector 36. As they do so, their presence is detected by the sensors 32 and 34 as their image is captured by the cameras 38 and 40. As shown in FIG. 9, as the person 116 passes through the detector 36 and no weapons are detected, and provided that the operator has not provided any manual or other inputs to change the condition of lock 30 controlling the inner entry door 28 to a set and held locked condition, the at least one processor in the operator terminal or other connected control unit causes lock 30 to change from the locked to the unlocked condition. The person 116 can then enter into the interior area 16 through opening inner entry door 28 as shown in FIG. 10.

Likewise as shown in FIG. 8, an individual 118 wishing to exit the facility may open the inner entry door 46 and pass into the exit passage 22. As the person 118 moves in the direction of Arrow O, the inner exit door will close and be held locked through the action of lock 48 responsive to operation of the at least one processor in the operator terminal or other controller. As the individual 118 moves in the direction of Arrow O as shown in FIG. 9, the individual is sensed by sensors 56 and 54 and their image is captured through the operation of cameras 58 and 60. As the individual approaches the outer exit door 50, the at least one processor responsive to sensing the individual through operation of sensor 54 causes the condition of lock 52 to change from a locked to an unlocked condition, enabling the individual 118 to open outer exit door 50 and to exit from the exit passage 22. Of course as can be appreciated, if an operator has provided one or more inputs which cause the lock 52 to be set and remain in a locked condition, the individual 118 will be generally prevented from exiting the exit passage. This might be done, for example, when an operator wishes to capture someone such as a thief that is attempting to exit the facility. By providing at least one input to the operator terminal such as for example by providing an input by touching icon 112 as shown in FIG. 5, the operator may control the system so as to cause the individual to be captured and detained within the exit passage. Of course these approaches are exemplary.

Alternatively, in some embodiments the control of the structure to exclude or detail selected individuals may be accomplished automatically responsive to operation of at least one processor. This may be done for example through analysis of image data from the cameras, such as is discussed in the incorporated disclosure. For example the system may be programmed to detain an individual based on facial features, clothing features or other features. The at least one processor may operate to identify the particular individual based on such features and detain them in the passageway.

Figure 11:
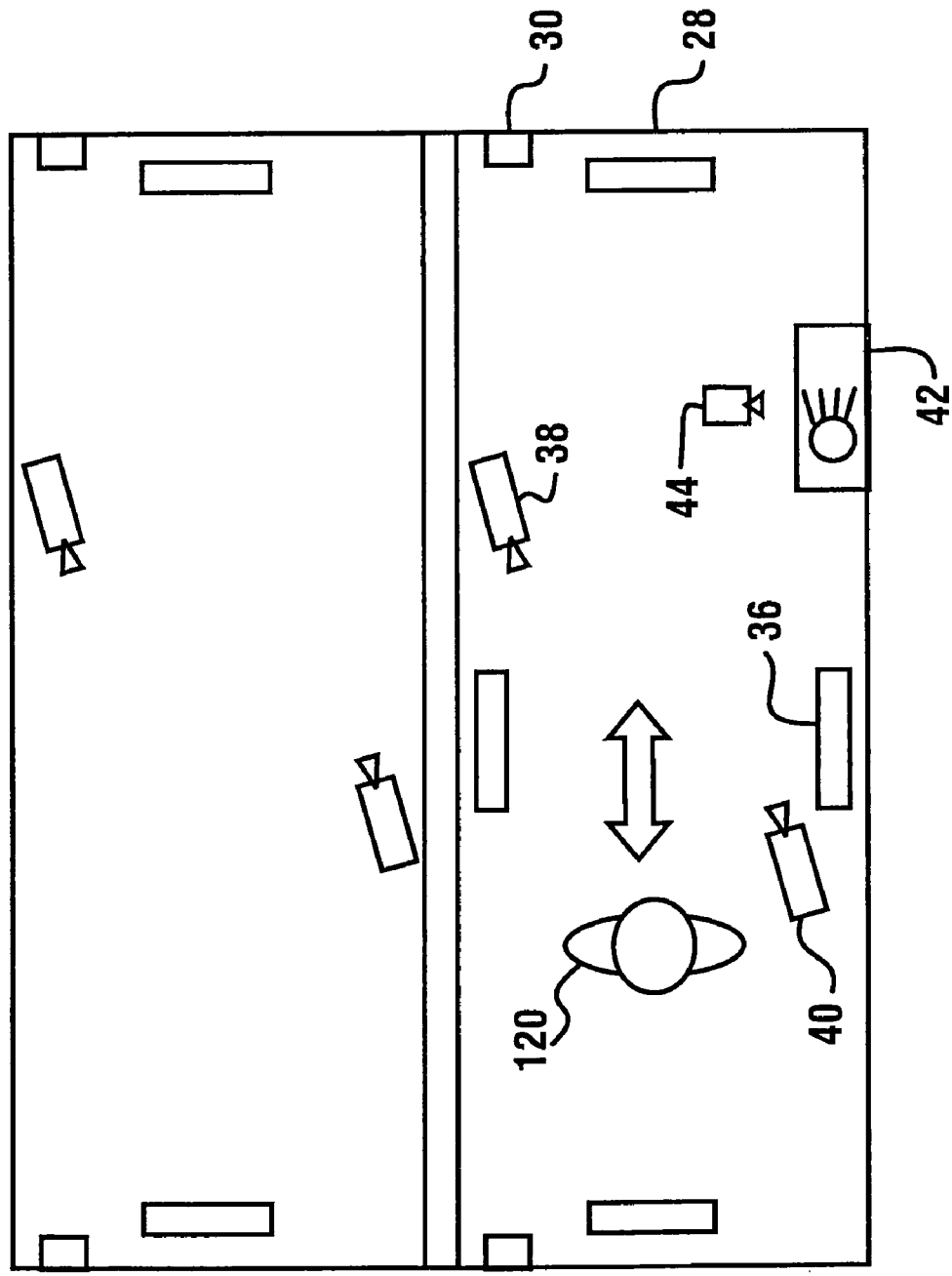

FIG. 11 shows an exemplary situation where an individual 120 is in possession of an object which the detector 36 and associated processor or other analysis device determines has a significant probability of being a weapon. In these circumstances the at least one processor of the operator terminal or connected control unit operates to cause an audible and visual output to be given through the operator terminal indicating that the detector has detected a suspect condition. The at least one processor also operates in accordance with its programming to cause the lock 30 to hold the inner entry door in a locked condition. In response to this condition at least one operator of the operator terminal may operate the terminal to provide audible instructions to the individual 120. These may include, for example, a request that the user place any metal items in their possession on the shelf 42. The audible instructions may include asking the individual 120 to remove clothing or other items. The instructions may include instructing the individual to step back on the other side of the detector 36 and pass through the detector again. This may be done as previously discussed by the operator speaking through the microphone of the operator terminal (or portable terminal) or alternatively providing one or more inputs which cause audible and/or visible outputs based on stored data in the operator terminal. It may be accomplished in other embodiments on an automated basis.

In these circumstances the operator may also provide inputs so as to view the items that the user has removed from their pocket through camera 44 or alternatively by viewing the items through the transparent walls of the structure. Alternatively or in addition the operator may review video captured of the individual 120 prior to triggering the alarm and/or after the alarm is first triggered to detect any unusual conditions such as the hiding of a weapon. The operator may then provide inputs through the operator terminal as appropriate to either allow the individual to enter if they can pass through the detector without triggering the detection of a probable weapon, or to provide inputs so as maintain the lock 30 locked so as to preclude the individual from entering. As can be appreciated the exemplary embodiments provide numerous options, programming to handle various types of conditions that may arise, as well as the ability for an operator to control various structures of the apparatus to meet different conditions.

The exemplary embodiment provides suitable indications and outputs while controlling functions of the structure so as to achieve desirable capabilities. It should be understood that these may be varied by those having skill in the art based on the teachings herein.

Thus the new apparatus of the exemplary embodiments achieve at least some of the above-stated objectives, eliminate difficulties encountered in the use of prior apparatus and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to those skilled in the art as being capable of performing the recited function, and shall not be deemed limited to the particular means or structures shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:
1. Apparatus comprising:
   a reader, wherein the reader is operative to read data from data bearing records, wherein the data corresponds to at least one of an individual and a category of individuals;
   an operator terminal operative to provide indicating outputs at least one of visually and audibly, and to control at least one component of a structure operative to control access to a facility,
   wherein the operator terminal includes a touchscreen display,
   wherein the operator terminal is configured for communication with at least one component of the structure,
   wherein the structure includes:
   an outer entry door,
   an outer entry door lock, wherein the outer entry door lock is in operative connection with the outer entry door and is electrically changeable between locked and unlocked conditions,
   an inner entry door,
   an inner entry door lock, wherein the inner entry door lock is in operative connection with the inner entry door and is electrically changeable between locked and unlocked conditions,
   a walled entry passage, wherein the walled entry passage extends generally continuously between the outer entry door and the inner entry door,
   at least one detector, wherein the at least one detector is operative to sense items corresponding to weapons, and wherein the at least one detector is positioned to detect items in the entry passage in at least one location between the outer entry door and the inner entry door, wherein at least one of the outer entry door lock and the inner entry door lock changes condition responsive at least in part to the at least one detector,
   at least one entry passage camera, wherein the at least one entry passage camera has a field of view that includes at least a portion of one of the outer entry door and the inner entry door,
   wherein the touchscreen display of the operator terminal is operative to provide at least one output image corresponding to the field of view of the at least one entry passage camera,
   wherein the at least one output image includes an image of at least a portion of one of the outer entry door and the inner entry door,
   at least one processor and at least one data store, wherein the at least one processor is in operative connection with the reader, the at least one data store and the operator terminal,
   wherein the at least one data store includes data corresponding to data readable from data bearing records corresponding to at least one of individuals and at least one category of individuals authorized to access the facility,
   wherein the at least one processor is operative to cause a change of condition of at least one of the outer entry door lock and the inner entry door lock responsive at least in part to a reader read data bearing record including data having a predetermined relationship to data stored in the at least one data store,
   wherein the at least one output image includes associated visible indicia, wherein the visible indicia changes with condition of the outer entry door lock or inner entry door lock associated with the one outer entry door or inner entry door included in the at least one output image,
   wherein the touchscreen display includes at least one lock associated visible feature, and wherein an input including screen contact corresponding to the at least one lock associated visible feature is operative to cause a change in condition of the inner entry door lock or outer entry door lock associated with the one outer entry door or inner entry door included in the at least one output image.

2. The apparatus according to claim 1 and further comprising:
at least one input device wherein the at least one input device is operative to receive inputs from individuals seeking to enter the facility,
and wherein the at least one data store includes data having a predetermined relationship to inputs associated with at least one of individuals and at least one category of individuals authorized to access the facility,
and wherein the at least one processor is operative to change condition of at least one of the outer entry door lock and the inner entry door lock responsive at least in part to an input device received input having a predetermined relationship to data stored in the at least one data store.

3. The apparatus according to claim 2 wherein the at least one input device comprises a biometric reader.

4. The apparatus according to claim 2 wherein the at least one input device comprises a keypad.

5. Apparatus comprising:
an operator terminal operative to provide indicating outputs at least one of visually and audibly, and to control at least one component of a structure operative to control access to a facility,
wherein the operator terminal includes a visual touch screen display,
wherein the operator terminal is configured for communication with the at least one component of the structure, wherein the structure includes:
an outer entry door,
an outer entry door lock, wherein the outer entry door lock is operative to lock the outer entry door and is electrically changeable between locked and unlocked conditions,
an inner entry door,
an inner entry door lock, wherein the inner entry door lock is operative to lock the inner entry door and is electrically changeable between locked and unlocked conditions,
a walled entry passage, wherein the walled entry passage extends generally continuously between the outer entry door and the inner entry door,
at least one detector, wherein the at least one detector is operative to sense items corresponding to weapons, wherein the at least one detector is positioned to sense the items in the walled entry passage in at least one location between the outer entry door and the inner entry door, wherein at least one of the outer entry door lock and the inner entry door lock is operative to change lock condition responsive at least in part to sensing by the at least one detector,
at least one entry passage camera, wherein the at least one entry passage camera has a field of view that includes at least a portion of at least one of the outer entry door and the inner entry door,
wherein the touch screen display is operative to provide at least one output image corresponding to the field of view of the at least one entry passage camera,
wherein the at least one output image includes an image of the at least a portion of the at least one of the outer entry door and the inner entry door,
wherein the at least one output image includes visible indicia, wherein the visible indicia changes with lock condition of at least one of the outer entry door lock and the inner entry door lock associated with the at least one of the outer entry door and the inner entry door included in the at least one output image,
wherein the touch screen display is operative to provide at least one lock associated visible feature, wherein at least one input corresponding to the at least one lock associated visible feature provided by the touch screen display is operative to cause a change in the lock condition of the at least one of the outer entry door lock and the inner entry door lock associated with the at least one of the outer entry door and the inner entry door included in the at least one output image.

6. The apparatus according to claim 5, wherein the at least one lock associated visible feature includes at least one icon.

7. The apparatus according to claim 6 wherein the display includes a graphical representation of the walled entry passage,
wherein the walled entry passage includes at least one sensor, wherein the at least one sensor is operative to sense at least one person in at least one location in the walled entry passage,
wherein the display is opeative to cause the graphical representation to include a representation of at least one person in a current location in the walled entry passage, responsive at least in part to operation of the at least one sensor.

8. The apparatus according to claim 7 wherein the graphical representation of the entry passage includes an icon corresponding to the outer entry door lock and an icon cooresponding to the inner entry door lock, and wherein at least one input including contact with one of the icons is operative to cause a change in lock condition of the respective lock corresponding to the respective icon.

9. The apparatus according to claim 7 wherein the operator terminal includes a graphical representation of the at least one detector,
wherein the operator terminal further includes at least one audio output device,
wherein the operator terminal is operative to provide at least one visual output and at least one audible output, responsive at least in part to the at least one detector sensing at least one item corresponding to a weapon.

10. The apparatus according to claim 5 wherein the visible indicia that changes with condition of at least one of the outer entry door lock and the inner entry door lock, includes a changeable color indicia.

11. The apparatus according to claim 10, wherein the changeable color indicia includes a border adjacent to at least one side of the at least one output image.

12. The apparatus according to claim 11 wherein the operator terminal is operative responsive to receiving at least one touch input corresponding to contact with a respective one of the first entry output image or the second entry output image, to change size of the respective one of the first entry output image or the second entry output image.

13. The apparatus according to claim 5
wherein the display includes a first entry output image including an image of at least a portion of the outer entry door,
wherein the display includes a second entry output image including an image of at least a portion of the inner entry door,
wherein each of the first entry output image and the second entry output image includes a corresponding lock associated visible feature, wherein the lock associated visible feature of the first entry output image changes color with changes in lock condition of the outer entry door lock, and
wherein the lock associated visible feature of the second entry output image changes color with changes in lock condition of the inner entry door lock.

14. The apparatus according to claim 5 wherein the structure further includes,
   an outer exit door,
   an outer exit door lock, wherein the outer exit door lock is electrically changeable between locked and unlocked conditions,
   an inner exit door,
   an inner exit door lock, wherein the inner exit door lock is electrically changeable between locked and unlocked conditions,
   a walled exit passage, wherein the walled exit passage extends generally continuously between the inner exit door and the outer exit door,
   at least one exit passage camera, wherein the at least one exit passage camera has a field of view that includes at least a portion of one of the outer exit door and the inner exit door,
   wherein the operator terminal includes at least one further output image corresponding to the field of view of the at least one exit passage camera, wherein the at least one further output image includes at least a portion of one of the outer exit door and the inner exit door,
   wherein the at least one further output image includes at least one further visible feature, wherein the at least one further visible feature changes with locked and unlocked conditions of the outer exit door lock or the inner exit door lock.

15. The apparatus according to claim 14 wherein the display includes
   a first entry output image of at least a portion of the outer entry door,
   a second entry output image of at least a portion of the inner entry door,
   a first exit output image of at least a portion of the outer exit door,
   a second exit output image of at least a portion of the inner exit door.

16. The apparatus according to claim 15 wherein each of the first entry output image, second entry output image, first exit output image, and second exit output image has at least one user selectable visible feature associated with the respective lock controlling the respective door included in association with the respective image, and
wherein manual selection of the at least one user selectable visible feature is associated with the respective lock is operative to cause a change in condition of the respective lock.

17. The apparatus according to claim 15 where in the operator terminal comprises a portable hand held device.

18. The apparatus according to claim 15 and further comprising:
   at least one reader,
   wherein the at least one reader is operative to read from data bearing records, data that corresponds to at least one of individuals and at least one category of individuals authorized to enter the facility,
   at least one processor and at least one data store,
   wherein the at least one processor is in operative connection with the at least one reader, the at least one data store and the at least one operator terminal,
   wherein the at least one data store includes data having a predetermined relationship with data readable from data bearing records associated with at least one of individuals and at least one category of individuals authorized to enter the facility,
   wherein the at least one processor is operative responsive to reader read data having a predetermined relationship to data stored in the at least one data store, to cause at least one of the outer entry door lock, the inner entry door lock, the outer exit door lock and the inner exit door lock to change condition between the locked condition and the unlocked condition.

19. The apparatus according to claim 5 and further comprising:
   at least one input device associated with the structure, wherein the at least one input device is operative to receive inputs from individuals who seek to at least one of enter and exit the facility,
   at least one data store,
   wherein the at least one data store includes data having a predetermined relationship to data inputtable by at least one of individuals and at least one category of individuals authorized to at least one of enter and exit the facility,
   at least one processor,
   wherein the at least one processor is operative to cause a change in condition of at least one lock associated with the structure, responsive at least in part to at least one input device received input having a predetermined relationship to data stored in the at least one data store.

20. The apparatus according to claim 19 wherein the at least one input device comprises at least one of a manual input device and a biometric reading device.

* * * * *